United States Patent [19]

Chabot

[11] Patent Number: 4,467,547
[45] Date of Patent: Aug. 28, 1984

[54] DEVICE FOR RETRIEVING A FISHING LURE

[76] Inventor: Louis Chabot, 685 Tonty, Ile Bizard, Québec, Canada, H9C 2A1

[21] Appl. No.: 382,562

[22] Filed: May 27, 1982

[51] Int. Cl.³ .............................................. A01K 97/00
[52] U.S. Cl. .................................................. 43/17.2
[58] Field of Search ........................ 43/17.2; 294/66.1

[56] References Cited

U.S. PATENT DOCUMENTS

| | | | |
|---|---|---|---|
| 2,630,650 | 3/1953 | Parker | 43/44.97 |
| 2,634,539 | 3/1953 | Brown et al. | 43/17.2 |
| 2,785,500 | 3/1957 | Ashley | 43/44.97 |
| 2,798,332 | 7/1957 | Garrison | 43/44.97 |
| 3,296,730 | 1/1967 | Leverdingen | 43/17.2 |
| 3,464,138 | 9/1969 | Lindner | 43/17.2 |
| 3,688,434 | 9/1972 | Le Vau | 43/44.97 |
| 3,783,549 | 1/1974 | Griggs | 43/42.4 |

Primary Examiner—Nicholas P. Godici
Assistant Examiner—Kurt Rowan
Attorney, Agent, or Firm—Schwartz, Jeffery, Schwaab, Mack, Blumenthal & Koch

[57] ABSTRACT

The disclosure describes a device which makes it possible to retrieve a fishing lure which has become snagged on an obstacle, such as rocks or branches, under water. It comprises prongs projecting on at least one side of an annular member in a plane perpendicular to the latter. The annular member is constructed so as to enable the fishing line to be inserted in the annular member at a point between the fishing lure and the fishing rod. A strong filament completes the device, and it is attached to the annular member. By sliding the device along the fishing line until it reaches the lure and moving it around with the filament it is possible, either to disengage the lure or pull it out of the water together with the obstacle.

4 Claims, 7 Drawing Figures

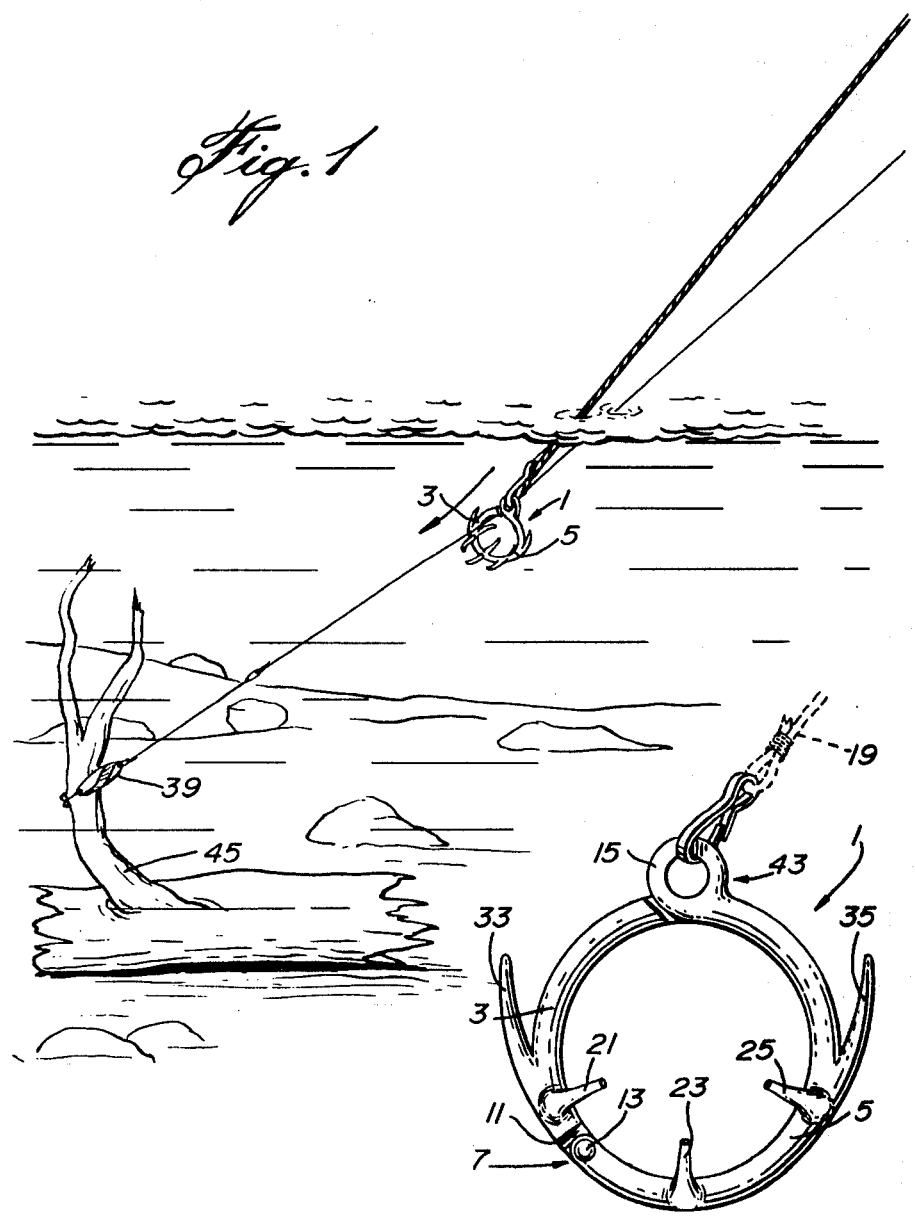

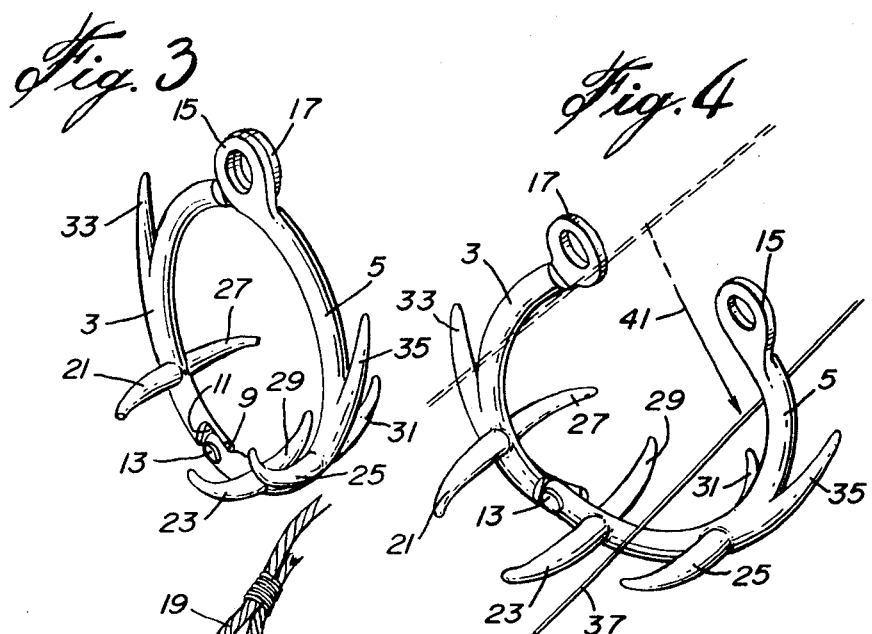
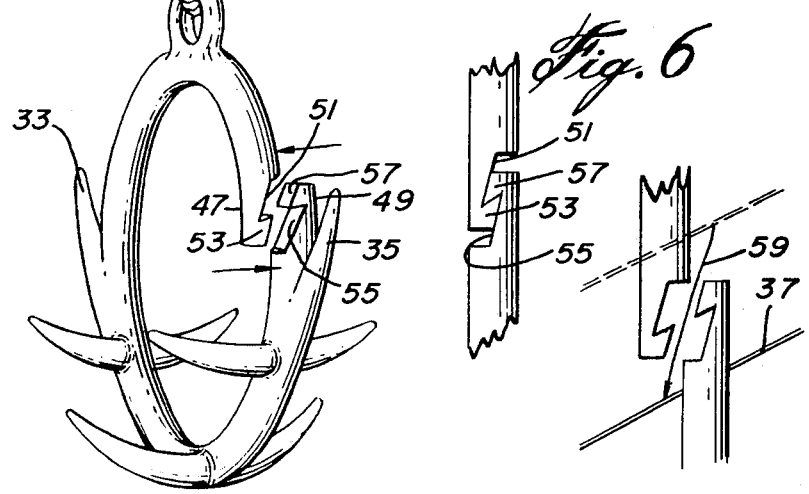

DEVICE FOR RETRIEVING A FISHING LURE

BACKGROUND OF THE INVENTION (a) Field of the Invention

This invention relates to a device for retrieving a finishing lure. More particularly, the invention is concerned with the retrieving of a fishing lure which has become snagged on an obstacle under water.

(b) Description of Prior Art

It is well known that a fisherman often has problems with his lures which have a tendency to snag under water on all kinds of obstacles, such as branches, rocks, tree trunks, etc. Most of the time, the only solution is to pull as hard as possible on the fishing line with the hope that the lure will unsnag. In some cases, this is sufficient to retrieve the lures either because they are not too strongly attached to the obstacle or because the latter is so small as to be pulled by the fishing line. However, very often, one has to pull sufficiently on the fishing line to break it, which means that the fishing lure is lost. Since these articles are often quite expensive, it is always very unpleasant to lose a lure under water.

There is therefore a need to prevent the snagging of fishing lures or at least to enable their recovery.

U.S. Pat. No. 2,630,650, dated Mar. 10, 1953, inventor L. R. Parker describes a retrieving sinker which has a tendency to be drawn upwardly rather than laterally when tugging action is applied thereto. If a lure is well hooked only onto an obstacle, there is no way that the Parker device will enable it to dislodge or to pull the obstacle above water level.

U.S. Pat. No. 2,785,500, issued Mar. 19, 1957, inventor G. R. Ashley, describes a fishhook recoiler from obstacles. The idea is to have a device which bounces off an obstacle and carries a fish line and hook with it when casting a fishing line. This device will not permit to retrieve a lure which has been caught onto an obstacle.

U.S. Pat. No. 2,798,322, issued July 9, 1957, inventor R. E. Garrison, discloses an anti-snag sinker which makes it possible for the sinker and hook to rock or swing over most obstructions under water.

U.S. Pat. No. 3,688,434 issued Sept. 5, 1972, inventor Walter H. Le Vau, describes a snagless fishing apparatus of the kind wherein the fishing line pulls horizontally on the lure thus decreasing the likelihood of the bait catching on underwater obstacles.

U.S. Pat. No. 3,783,549, issued Jan. 9, 1974, inventor W. Kenneth Griggs, is concerned with a device to prevent snagging and loss of fishing lures and sinkers. The configuration of the device enables the hook and lure to ride over rocks and obstacles.

It will be realized that none of the above systems is concerned with the retrieving of a fishing lure, once the latter has been caught by an underwater obstacle.

SUMMARY OF THE INVENTION

It is an object of the present invention to provide a device which permits the retrieval of a fishing lure which becomes snagged on an obstacle, such as rock or branches, under water.

This object may be attained by means of a device which comprises:

an annular member;

prong means projecting on at least one side from said annular member, substantially perpendicularly to the plane thereof;

means enabling to insert the fishing line inside the annular member, the insertion taking place at a point of the fishing line between the fishing lure and the fishing rod;

a strong filament; and means for attaching one end of the filament to the annular member.

BRIEF DESCRIPTION OF DRAWINGS

The invention will now be illustrated by means of the following drawings, in which:

FIG. 1 is a view of the device according to the invention being guided towards the caught fishing lure;

FIG. 2 is a view showing one side of the device;

FIG. 3 is a perspective view of the same device;

FIG. 4 is a view showing the device being opened to insert the fishing line therein;

FIG. 5 is a perspective view of another embodiment showing an alternate way of inserting the fishing line;

FIG. 6 is a view of the disengageable ends of the annular member illustrated in FIG. 5 enabling to insert the fishing line therein; and FIG. 7 is a view showing the fishing line being inserted in the annular member of FIG. 5.

DESCRIPTION OF THE PREFERRED EMBODIMENTS

With reference to the drawings, more particularly FIGS. 1, 2, 3 and 4, it will be seen that the device according to the invention comprises an annular member 1 whose cross section, as shown, is circular. In the embodiment illustrated in FIGS. 2 to 4, the annular member is formed of two arcuate members 3 and 5 which are pivotally connected together at 7 by having one end of each of the arcuate members mating together, as shown.

More particularly, the mating ends of the annular member are notched as at 9 and 11 so as to form an overlap. Pivoting is made possible by inserting a pivot pin 13 through the overlapping portions of the mating ends.

The other end of each of the arcuate members 3 and 5 terminate into mating eyelets 15 and 17. It will be noted that in the closed position of the arcuate members 3 and 5 to form the annular member 1, the eyelets 15, 17 overlap one another to form a single attachment for the filament 19 as will be discussed later.

In the illustrated embodiment, three prongs 21, 23, 25, project from one side of the annular member 1, generally perpendicularly to the plane of the annular member.

On the other side of the annular member 1, there are three corresponding prongs 27, 29 and 31.

In addition to the six prongs which project on both sides of the annular member 1, there are also prongs 33 and 35 which are in the plane of the annular member and which extend substantially tangentially from the annular member 1. As shown, all the prongs which are provided on the annular member are slightly curved and terminate into pointed ends so as to be capable of gripping onto an obstacle, such as a piece of rock, a branch, a tree trunk, etc. In other words, prongs 21, 23, 25, 27, 29 and 31 curve towards the axis of the annular member while prongs 33 and 35 curve towards the annular member itself.

In operation, the arcuate members 3 and 5 are opened as shown in FIG. 4, and the fishing line 37, at a point which is located between the fishing rod, not shown, and the fishing lure 39, is inserted in the annular member in the direction shown by the arrow 41. Once this is done, the arcuate members are closed by connecting the two eyelets 15, 17 together to form a single ring 43. A strong filament 19 is attached at one end to the ring 43 and the annular member 1 is allowed to slide along the fishing line 37 until it reaches the lure 39 and the obstacle 45. By moving the device using the filament 19, it is possible either to disengage the lure 39 or to pull the whole obstacle 45 together with the lure at the surface where the lure is freed from the obstacle.

According to another embodiment, instead of forming the annular member 1 of two arcuate members 3 and 5, the annular member has two connecting ends 47, 49 which can be engaged together by double male female engagement, as shown in FIGS. 5, 6 and 7. For this purpose, the end 47 of the annular member is notched as at 51 to form a stud 53. Similarly, the end 49 is notched at 55 to form a stud 57. In engagement, stud 57 is engaged by the notch 51 while stud 53 is engaged by the notch 55. To insert the fishing line 37 in the annular member it is merely necessary to disengage the ends 47, 49 as shown in FIG. 7 and to slide the fishing line 37 in the space formed between them, in the direction of the arrow 59.

Once the annular member has been closed as shown in FIG. 6, it is merely necessary to slide the device as indicated above to either retrieve the lure or the lure with the obstacle.

I claim:

1. Device for retrieving a fishing lure which is attached to a fishing rod via a fishing line and which has become snagged on an obstacle under water, said device comprising:

an annular member;

a first plurality of prongs provided on one side of said annular member along only substantially half a first the perimeter of said annular member and perpendicularly to the plane thereof, a second plurality of prongs provided on the other side of said annular member perpendicularly to the plane thereof and opposite the said first plurality of prongs, said first and second plurality of prongs having outer ends curving toward the axis of said annular member;

a pair of prongs mounted on the second half of the perimeter of the annular member diametrically opposite one another and curving toward the annular member, said pair of prongs extending substantially tangentially from said annular member, in the plane thereof means enabling the insertion of the fishing line inside said annular member, insertion of said fishing line taking place at a point of said fishing line between said fishing lure and said fishing rod;

a strong filament;

means for attaching one end of said filament to said annular member.

2. Device according to claim 1, wherein said annular member is formed of two arcuate members pivotally connected together at one end of each said arcuate members, the other end of each said arcuate members terminating into an eyelet, both said eyelets mating together for closing the arcuate members to form said annular member, said mating eyelets forming a ring serving to attach said one end of said filament.

3. Device according to claim 1, which comprises means defining a transverse channel in said annular member to permit said fishing line to be inserted into said annular member by sliding through said channel.

4. Device according to claim 1, wherein said annular member has two ends connected together by male female engagement, so that for inserting said fishing line into said annular member said ends are disengaged, said ends springing back into a male female engagement when said fishing line has been inserted into said annular member.

* * * * *